United States Patent
Filsfils et al.

(10) Patent No.: US 10,868,755 B2
(45) Date of Patent: Dec. 15, 2020

(54) IMPLEMENTING BI-DIRECTIONAL PATHS IN SEGMENT ROUTING NETWORKS

(71) Applicant: Cisco Technology, Inc., San Jose, CA (US)

(72) Inventors: Clarence Filsfils, Brussels (BE); Zafar Ali, Hicksville, NY (US); Francois Clad, Strasbourg (FR); Muthurajah Sivabalan, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 62 days.

(21) Appl. No.: 16/228,751

(22) Filed: Dec. 20, 2018

(65) Prior Publication Data

US 2020/0204479 A1    Jun. 25, 2020

(51) Int. Cl.

| G06F 15/173 | (2006.01) |
| --- | --- |
| H04L 12/707 | (2013.01) |
| H04L 12/723 | (2013.01) |
| H04L 12/721 | (2013.01) |
| H04L 12/741 | (2013.01) |
| H04L 12/715 | (2013.01) |

(52) U.S. Cl.
CPC .............. *H04L 45/24* (2013.01); *H04L 45/44* (2013.01); *H04L 45/507* (2013.01); *H04L 45/64* (2013.01); *H04L 45/74* (2013.01)

(58) Field of Classification Search
CPC ....... H04L 45/24; H04L 45/44; H04L 45/507; H04L 45/64; H04L 45/74
USPC ......................................................... 709/238
See application file for complete search history.

(56) References Cited

U.S. PATENT DOCUMENTS

| 8,824,451 B2 | 9/2014 | Zhang et al. |
| 9,294,416 B2 | 3/2016 | Ceccarelli et al. |
| 9,503,363 B2 | 11/2016 | Sivabalan et al. |

OTHER PUBLICATIONS

Varkama, Samu, "MPLS Segment Routing Technology Study," Kymenlaakso University of Applied Sciences, Apr. 2017, 54 pages.
Cisco, "Flex LSP Overview," https://www.cisco.com/c/en/us/td/docs/routers/asr920/configuration/guide/mpls/b-mp-basic-xe-16-5-asr920/mpls_te-flex-lsp.pdf, 32 pages.
Zhang, et al., "RSVP-TE Extensions for Associated Bidirectional Label Switched Paths (LSPs)," Internet Standards Track, Internet Engineering Task Force (IETF), https://tools.ietf.org/html/rfc7551, May 2005, 20 pages.

*Primary Examiner* — Quang N Nguyen
*Assistant Examiner* — Joseph R Maniwang
(74) *Attorney, Agent, or Firm* — Patterson + Sheridan, LLP (57) ABSTRACT

Techniques for implementing bi-directional paths in a segment routing communication network are described. A first segment routing policy, including a first path from a first node in the communication network to a second node in the communication network, is installed. A second segment routing policy, including a second path from the second node to the first node in the communication network, is installed. At the first node, a first identifier associated with the first segment routing policy is bound to a second association identifier associated with the second segment routing policy. At the second node, a second identifier associated with the second segment routing policy is bound to a first association identifier associated with the first segment routing policy.

20 Claims, 7 Drawing Sheets

FIG. 7

IMPLEMENTING BI-DIRECTIONAL PATHS IN SEGMENT ROUTING NETWORKS

TECHNICAL FIELD

Aspects of the present disclosure relate to communication networks, and more specifically, though not exclusively, to techniques for supporting bi-directional paths in a segment routed communication network.

BACKGROUND

In Multi-Protocol Label Switching (MPLS) networks, the Resource Reservation Protocol (RSVP) can be used as a transport layer protocol to reserve resources across a network. The Resource Reservation Protocol-Traffic Engineering (RSVP-TE) is an extension of RSVP that can be used for traffic engineering. In particular, RSVP-TE can be used to establish label-switched paths (LSPs) in the network.

In an MPLS network, a network operator can establish a number of LSPs to route traffic along specified paths. These LSPs are uni-directional, meaning the established paths flow in one direction, from an origin to a destination. Flex LSP (also known as Associated Bidirectional LSPs) is a service that uses RSVP-TE to establish bi-directional LSPs in MPLS networks. Further, Flex LSP can be used to establish congruent bi-directional LSPs, and can support in-band operation, administration, and maintenance (OAM).

Segment routing (SR) is a network technology that can enhance Internet Protocol (IP) and MPLS networks using a source routing paradigm. In an SR network, a source node chooses a path and encodes it in the packet header as an ordered list of segments. In an SR-MPLS network, a segment can be encoded as an MPLS label, and an ordered list of segments can be encoded as a stack of labels. These encoded segments are used for routing along the designated path. After a segment has been traversed, the label identifying that segment is popped from the stack of labels.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Embodiments described herein include a method for implementing bi-directional paths in a segment routing communication network. The method includes installing a first segment routing policy, including a first path from a first node in the communication network to a second node in the communication network. The method further includes installing a second segment routing policy, including a second path from the second node to the first node in the communication network. The method further includes binding, at the first node, a first identifier associated with the first segment routing policy to a second association identifier associated with the second segment routing policy. The method further includes binding, at the second node, a second identifier associated with the second segment routing policy to a first association identifier associated with the first segment routing policy.

Embodiments described herein further include a computer program product for implementing bi-directional paths in a segment routing communication network. The computer program product includes a computer-readable storage medium having computer-readable program code embodied therewith, the computer-readable program code executable by one or more computer processors to perform an operation. The operation includes installing a first segment routing policy, including a first path from a first node in the communication network to a second node in the communication network. The operation further includes installing a second segment routing policy, including a second path from the second node to the first node in the communication network. The operation further includes binding, at the first node, a first identifier associated with the first segment routing policy to a second association identifier associated with the second segment routing policy. The method further includes binding, at the second node, a second identifier associated with the second segment routing policy to a first association identifier associated with the first segment routing policy.

Embodiments described herein further include a system. The system includes a processor, and a memory storing a program, which, when executed on the processor, performs an operation. The operation includes installing a first segment routing policy, including a first path from a first node in the communication network to a second node in the communication network. The operation further includes installing a second segment routing policy, including a second path from the second node to the first node in the communication network. The operation further includes binding, at the first node, a first identifier associated with the first segment routing policy to a second association identifier associated with the second segment routing policy. The method further includes binding, at the second node, a second identifier associated with the second segment routing policy to a first association identifier associated with the first segment routing policy.

Example Embodiments

Segment routing is becoming increasingly popular for software defined networking (SDN) networks. An SR network can use an SR policy to steer traffic through the network. The SR policy provides a list of segments that specify a path from a source node to a destination node, in the network.

Like an LSP in a classical MPLS network, an SR policy is unidirectional. The techniques used to establish a Flex LSP service with bi-directional paths in a classical MPLS network (e.g., using RSVP-TE) cannot be transferred to an SR network. This is because, unlike RSVP-TE in classical MPLS networks, SR networks do not maintain per LSP state during transit or at the endpoint of an SR policy. Because of this, an SR node at the end-point of an SR policy does not recognize the incoming policy.

According to one or more embodiments disclosed herein, an association identifier (e.g., an association label or association segment identifier (SID)) is used to bind two unidirectional SR policies in an SR network, creating a bi-directional LSP in the SR network. In an embodiment, the association identifier is tied to an incoming SR policy for a node, and can be used to correlate an outgoing SR policy at the node with the incoming SR policy.

For example, outgoing SR policies at a node in an SR network can be identified using a binding SID associated with a particular outgoing SR policy. The node can correlate this binding SID for an outgoing SR policy with an association identifier identifying the corresponding incoming SR policy. Traffic transmitted over the incoming SR policy can include the association identifier, allowing the recipient endpoint node to identify the SR policy used to transmit the traffic and associate bi-directional policies.

For example, in an SR-MPLS network, the association label can be encoded in a packet header as the bottom label in the stack of MPLS labels. The destination node can pop the association label, upon receiving the packet, and use the popped association label to identify the outgoing SR policy corresponding to the incoming SR policy over which the packet traveled. Similarly, in an SR-IPv6 network, an association SID can be encoded in a packet header and used by a recipient node to identify the corresponding outgoing SR policy. In this way, traffic received at a node from an incoming SR policy identified by the association identifier can be transmitted using the SR policy identified using the corresponding binding SID—creating a bi-directional LSP in the SR network.

Figure 1:
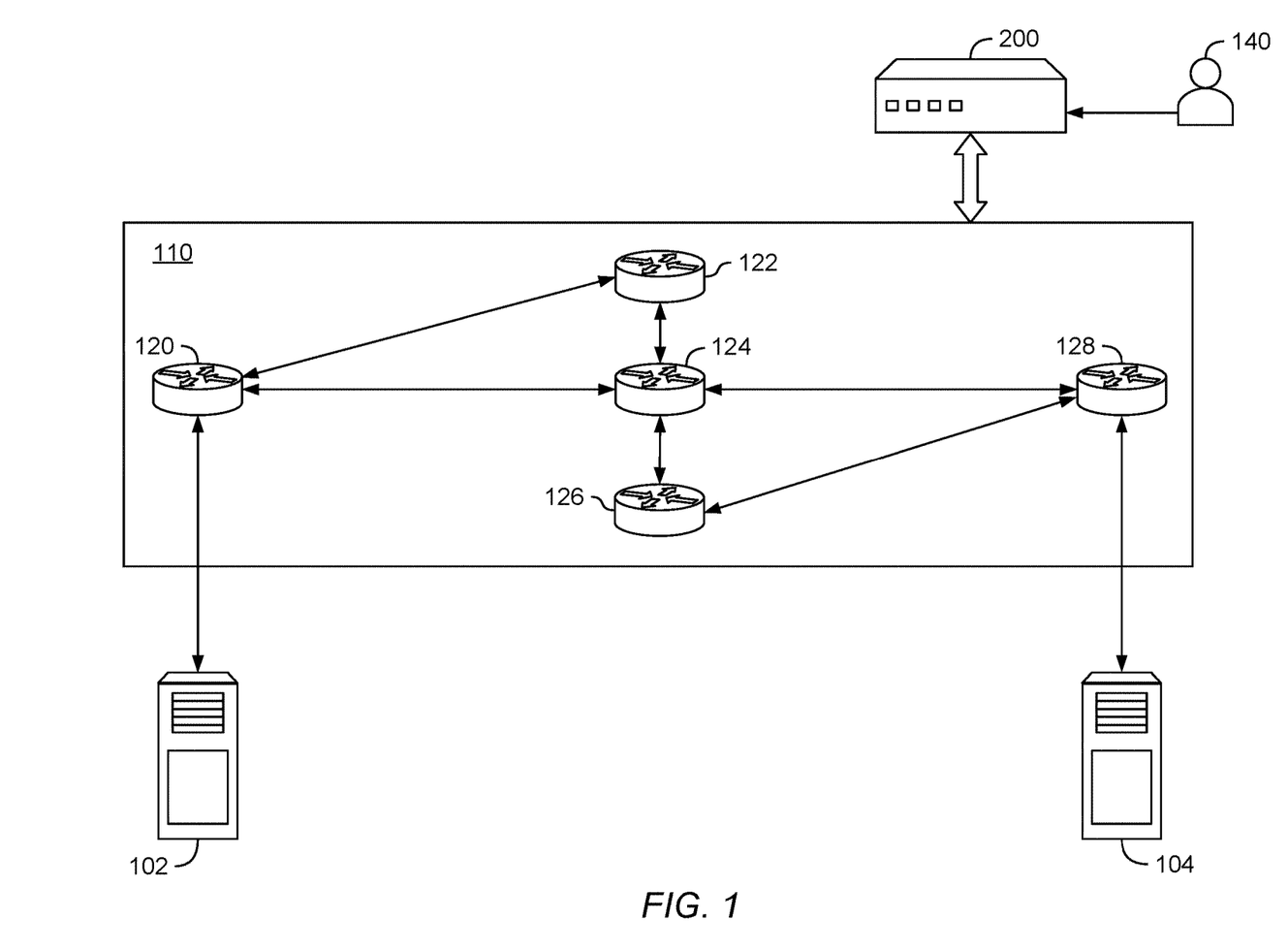
FIG. 1 illustrates a segment routing communication network, according to one embodiment described herein.

FIG. 1 illustrates a segment routing communication network, according to one embodiment described herein. A network administrator 140 uses an SDN controller 200 to configure an SR network 110. The SDN controller 200 is discussed in more detail with regard to FIG. 2, below. The SR network 110 is a segment routing network made up of nodes 120, 122, 124, 126, and 128. Each of these nodes can be, for example, a router, a switch, or another suitable node. The SR network 110 can be a wired network, a WiFi network, a cellular network, or can use any other suitable physical transmission medium. The SR network 110 can be used to provide a connection between user devices 102 and 104.

For example, user device 102 can transmit data to user device 104 using the SR network 110. The user device 102 is connected with the node 120, while the user device 104 is connected with the node 128. The network administrator 140 uses the SDN controller 200 to establish a path between the node 120 and the node 128. For example, the SDN controller 200 can establish a path from the node 120 through the node 124 to the node 128. The SDN controller 200 can install an SR policy including this path. Traffic flowing from the user device 102 to the user device 104 is routed through this SR policy.

Similarly, the SDN controller 200 can establish a reverse path from the node 128 to the node 120. This path could include the node 128 to the node 126 to the node 124 to the node 120. The SDN controller 200 can install a second SR policy including this path. Traffic flowing from the user device 104 to the user device 102 is routed through this second SR policy. In a traditional SR network, the SR policy from the node 120 to the node 128 is not associated with the reverse SR policy from node 128 to node 120. Each SR policy is unidirectional.

Figure 2:
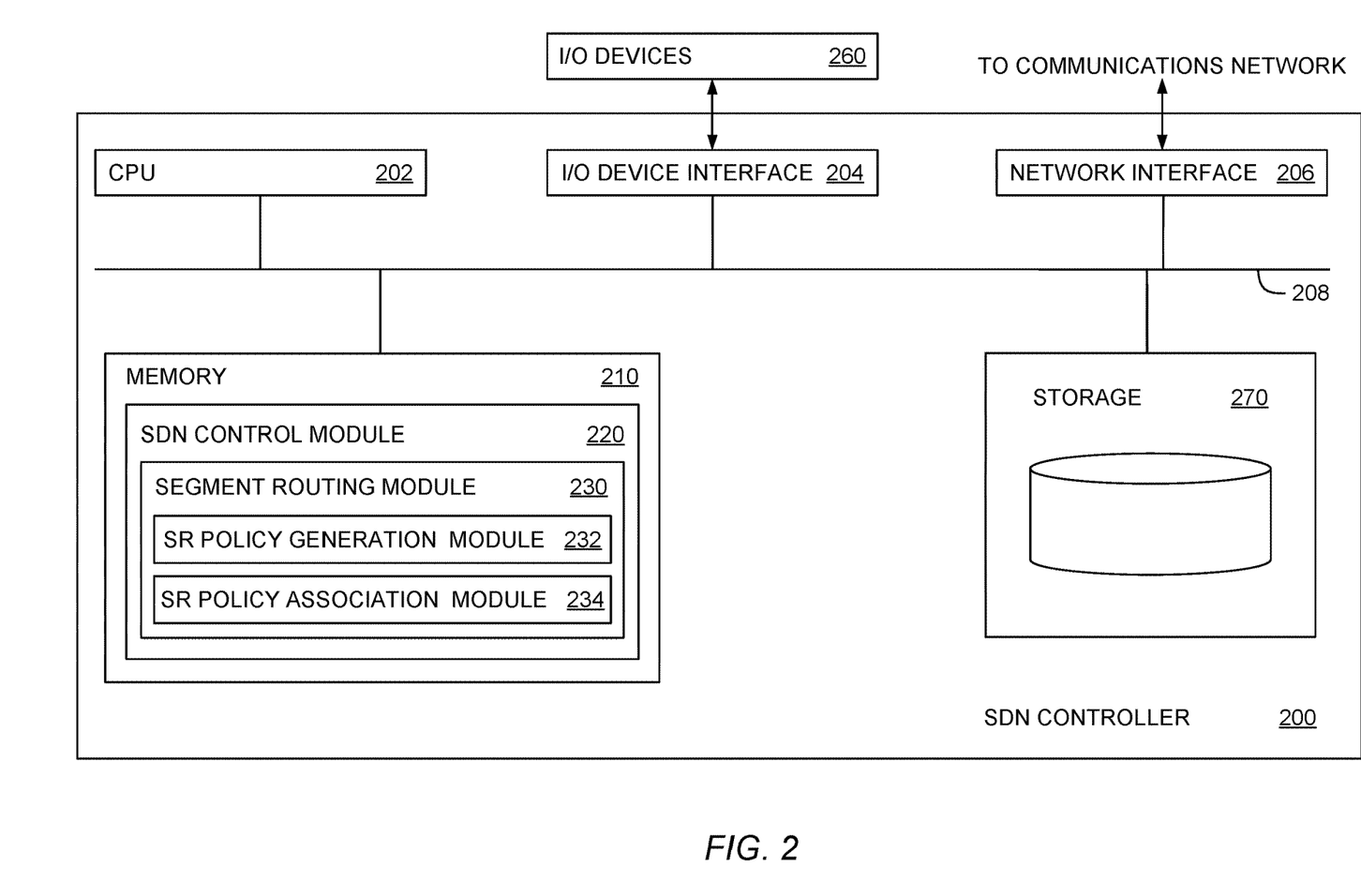
FIG. 2 illustrates an SDN controller, according to one embodiment described herein.

FIG. 2 illustrates an SDN controller 200, according to one embodiment described herein. As shown, the SDN controller 200 includes, without limitation, a central processing unit (CPU) 202, a network interface 206, a memory 210, and storage 270, each connected to a bus 208. In an embodiment, the SDN controller 200 also includes an Input/Output (I/O) device interface 204 for connecting to I/O devices 260. In an embodiment, the I/O devices 260 can be external I/O devices (e.g., keyboard, display and mouse devices). Alternatively, the I/O devices 260 can be built in I/O devices (e.g., a touch screen display or touchpad). As another alternative, the SDN controller 200 does not include its own I/O device interface 204 and is instead managed remotely using the network interface 206. Further, in context of this disclosure, the computing elements shown in the SDN controller 200 may correspond to a physical computing system (e.g., a system in a data center) or may be a virtual computing instance executing within a computing cloud, as discussed further below.

The CPU 202 retrieves and executes programming instructions stored in the memory 210 as well as stores and retrieves application data residing in the storage 270. The bus 208 is used to transmit programming instructions and application data between the CPU 202, the I/O device interface 204, the storage 270, the network interface 206, and the memory 210. The CPU 202 is included to be representative of a CPU, multiple CPUs, a single CPU having multiple processing cores, graphics processing units (GPUs) having multiple execution paths, and the like. The memory 210 is generally included to be representative of electronic storage of any suitable type(s), including random access memory or non-volatile storage. The storage 270 may be a disk drive storage device. Although shown as a single unit, the storage 270 may be a combination of fixed or removable storage devices, such as fixed disc drives, removable memory cards, network attached storage (NAS), or a storage area-network (SAN).

The memory 210 generally includes program code for performing various functions related to software defined networking. The program code is generally described as various functional "applications," "components," or "modules" within the memory 210, although alternate implementations may have different functions or combinations of functions. Within the memory 210, the SDN control module 220 implements software defined network functionality. This is described further with regard to FIGS. 3-7.

The memory 210 further includes a segment routing module 230. The segment routing module 230 implements segment routing functionality in a communication network. The segment routing module 230 includes an SR policy generation module 232. The SR policy generation module 232 identifies and generates SR policies within a communication network. The segment routing module 230 further includes an SR policy association module 234. The SR policy association module 234 associates SR policies. For example, as discussed further in relation to FIGS. 3-7, the SR policy association module 234 can associate forward and reverse SR policies in an SR network.

In an embodiment, the SDN controller 200 can be made up of multiple computing systems. For example, the SDN controller 200 can be de-centralized and distributed over multiple computing systems. Further, the SDN controller 200 can be implemented, in whole or in part, on the routing nodes (e.g., one or more of the nodes 120, 122, 124, 126, and 128 illustrated in FIG. 1).

Figure 3:
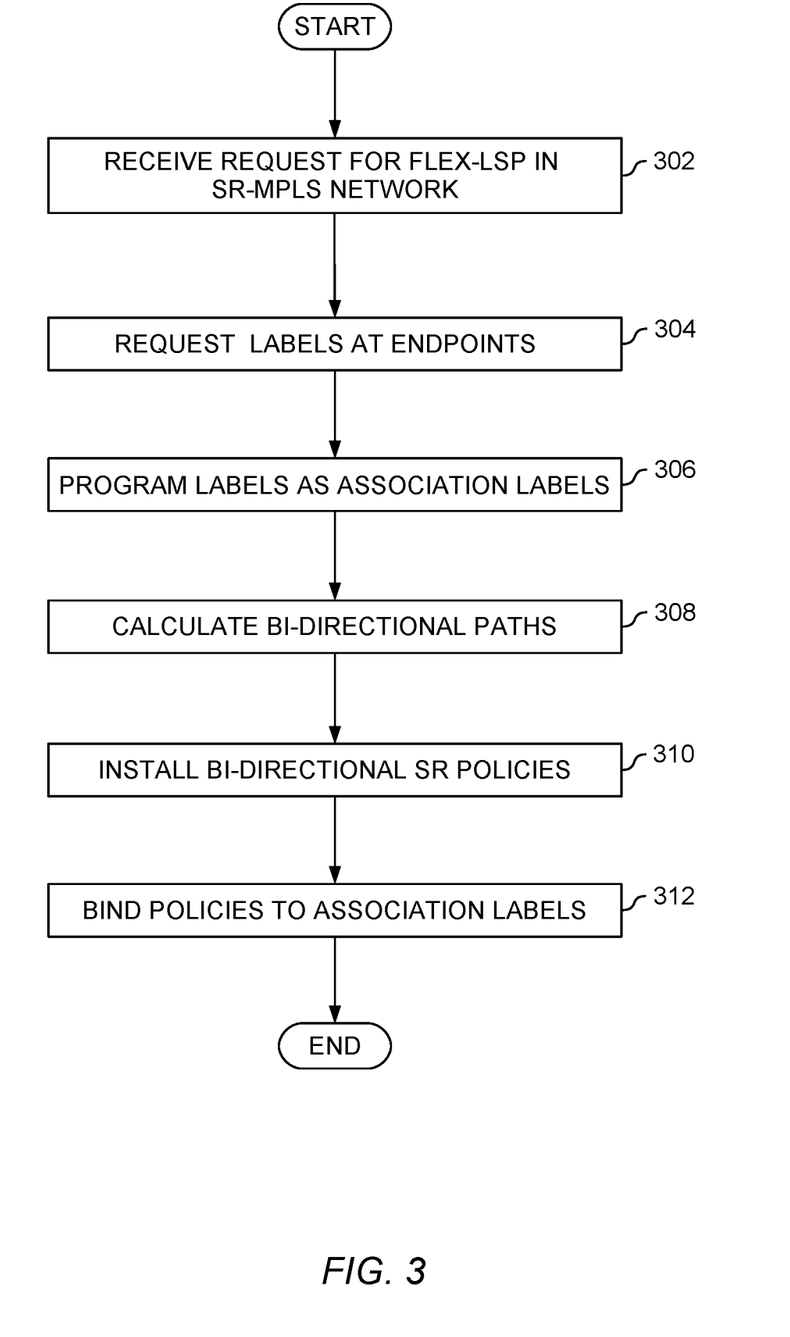
FIG. 3 is a flowchart illustrating implementing bi-directional LSPs in an SR-MPLS communication network, according to one embodiment described herein.
Figure 4:
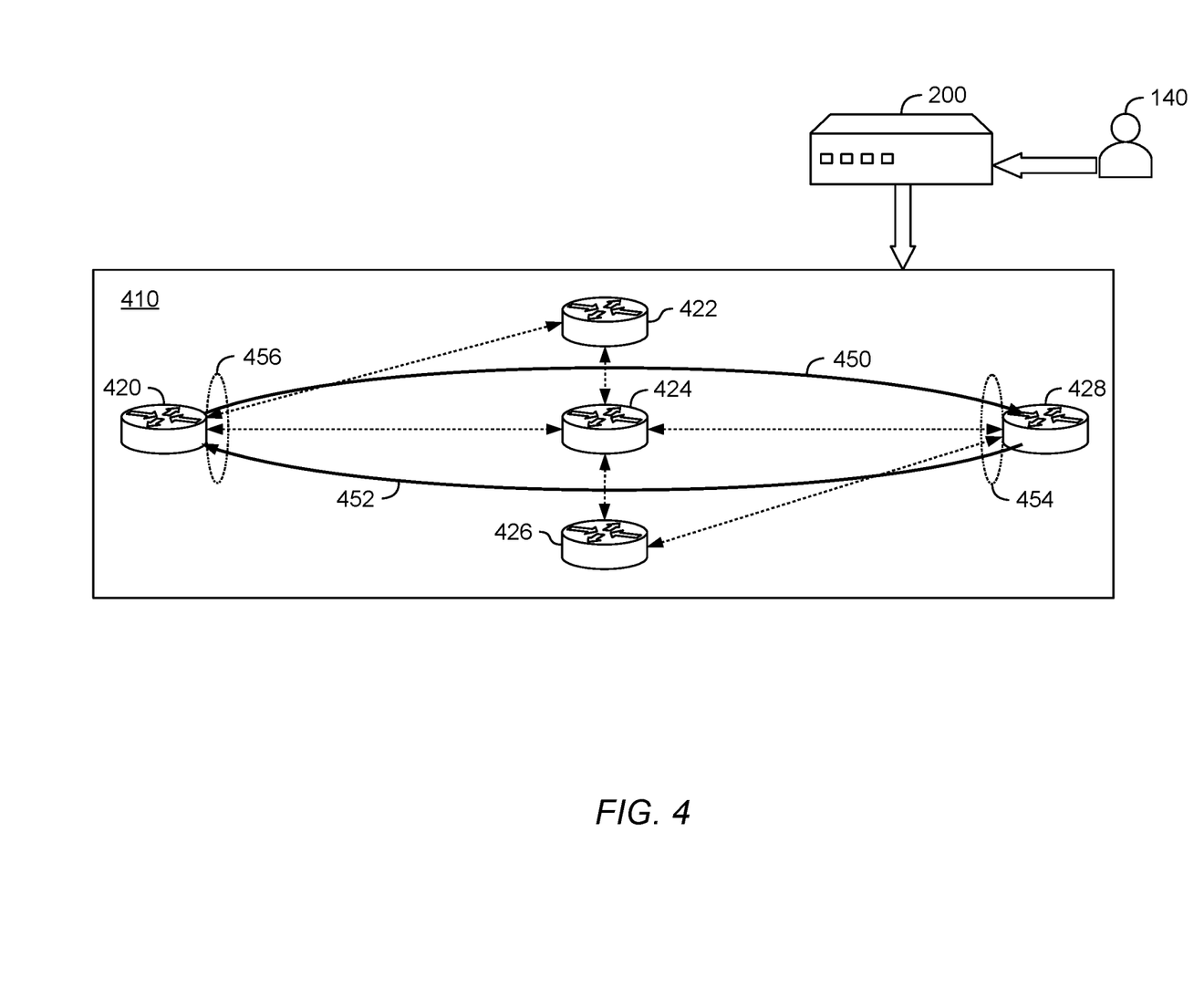
FIG. 4 illustrates a segment routing communication network implementing bi-directional LSPs, according to one embodiment described herein.

FIG. 3 is a flowchart illustrating implementing bi-directional LSPs in an SR-MPLS communication network, according to one embodiment described herein. FIG. 4 illustrates an SR communication network 410 implementing bi-directional LSPs, according to one embodiment described herein. The SR communication network 410 includes the nodes 420, 422, 424, 426, and 428. For example, the flow illustrated in FIG. 3 can be performed using the communication network illustrated in FIG. 4. For ease of explanation, FIGS. 3 and 4 will be discussed together.

At block 302, an SDN controller in an SR-MPLS network receives a request to form a Flex LSP service. For example, a network administrator can request that an SDN controller establish a Flex LSP between two endpoints. This is illustrated in FIG. 4: a network administrator 140 requests that the SDN controller 200 establish a Flex LSP between the nodes 420 and 428. In an embodiment, this request can include specific bandwidth requirements, or other quality of service parameters.

At block 304, a segment routing module (e.g., the segment routing module 230 illustrated in FIG. 2) requests labels from each of the endpoints. For example, as illustrated in FIG. 4, a segment routing module in the SDN controller 200 requests a free label from the node 420 and a free label from the node 428. In an embodiment, the destination node for an SR policy assigns the association label for that policy. That is, the segment routing module requests a free label from the node 428 to use as the association label for the policy from the node 420 to the node 428. And the segment routing module requests a free label from the node 420 to use as the association label for the policy from the node 428 to the node 420. Alternatively, the SDN controller itself could determine each label. Or, as another alternative, the transmit node (e.g., the node 420 in the path from the node 420 to the node 428), or another suitable node, could determine the association label.

As another alternative, the segment routing module can use a topological or service SID as the association label (or association SID) and can use pseudocode to perform the association functionality in addition to regular processing. That is, in an embodiment, the nodes 420 and 428 can allocate a topological or service SID to perform two functions: the association function and the regular function associated with the SID. For example, the nodes 420 and 428 can allocate an "END.associate" SID, that performs two functions: a regular END function and the association function.

At block 306, the segment routing module programs the labels received at block 304 as association labels at each endpoint node. For example, the segment routing module requests and receives a free label from the node 428. The segment routing module then instructs the node 428 to use the received value as an association label, for a to-be-defined pair of policies. The segment routing module does the same at the node 420, using the free label provided by the node 420.

An SR policy association module (e.g., the SR policy association module 234 illustrated in FIG. 2) further instructs the endpoint nodes (e.g., the nodes 420 and 428) to use the association label corresponding to each SR policy when transmitting traffic using that policy. For example, the SR policy association module can instruct the node 420 to include an association label identifying the policy 450 in traffic transmitted using the policy 450. As one example, the node 420 can include the association label as the bottom label in the stack of MPLS labels encoded in the packet header and used for routing the packet. The recipient node (e.g., the node 428) can pop this association label and use it to correlate the bi-directional paths.

At block 308, an SR policy generation module (e.g., the SR policy generation module 232) calculates the bi-directional paths. For example, the SR policy generation module calculates the path from the node 420 to the node 428, and from the node 428 to the node 420. In an embodiment, the network administrator 140 can request congruent bi-directional paths for the Flex LSP. In an embodiment, congruent bi-directional paths travel through the same nodes in each direction, while non-congruent bi-directional paths can travel through different nodes in the different directions. In an embodiment, the SR policy generation module can use any suitable techniques to calculate the bi-directional paths. For example, the SR policy generation module can use shortest path routing, or can take into account network utilization, network capacity, and other constraints.

At block 310, the SR policy generation module installs the bi-directional SR policies. For example, the SR policy generation module installs the SR policy 450 at the node 420 to specify the path from the node 420 to the node 428. The SR policy generation module further installs the SR policy 452 at the node 428 to specify the reverse path, from the node 428 to the node 420. In an embodiment, the SDN controller takes into account various requirements from the network administrator when installing the SR policies 450 and 452, including path protection, congruency, and bandwidth requirements. This is discussed in further detail with respect to FIG. 5, below.

At block 312, the SR policy association module binds the policies to the association labels. For example, at the node 420, the SR policy association module binds the SID identifying the outgoing SR policy 450 with the association label identifying the incoming policy 452. This is illustrated with the circle 456. The SR policy association module does the same at the node 428, binding the SID identifying the SR policy 452 with the association label identifying the SR policy 450. The binding at the node 428 is illustrated with the circle 454. This is discussed in more detail with regard to FIG. 6, below.

Figure 5:
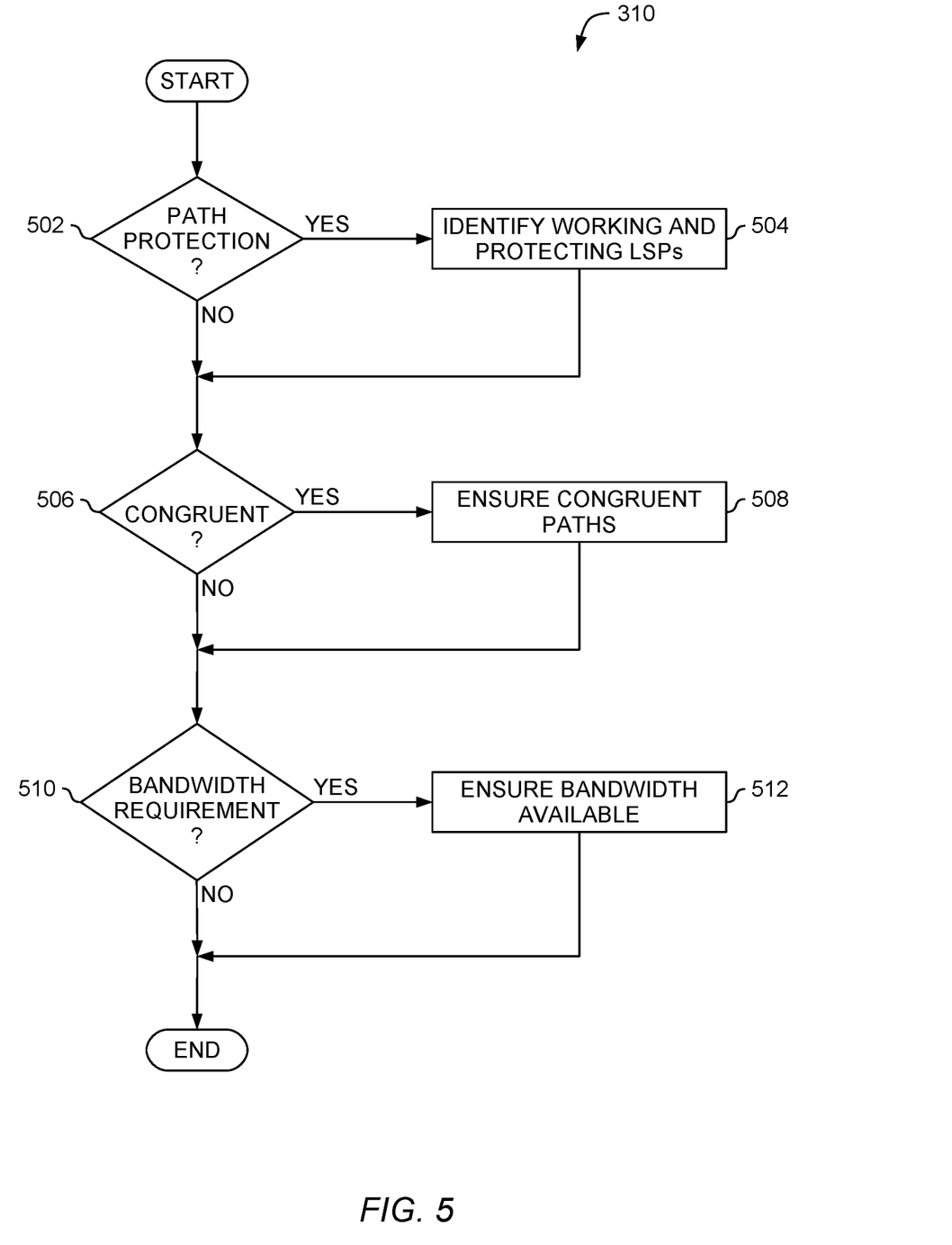
FIG. 5 is a flowchart illustrating installation of bi-directional SR policies, according to one embodiment described herein.

FIG. 5 is a flowchart illustrating installation of bi-directional SR policies, according to one embodiment described herein. In an embodiment, FIG. 5 corresponds to block 310 illustrated in FIG. 3. At block 502, an SDN controller (e.g., the SDN controller 200 illustrated in FIG. 4) determines whether the Flex LSP requires path protection. In an embodiment, a network administrator (e.g., the network administrator 140 illustrated in FIG. 4) can request path protection for the Flex LSP service. In a LSP with path protection, both a primary and a secondary path are configured. In the context of an SR network, an SDN controller can install a working (i.e., primary) path and a protecting (i.e., secondary) path for a given SR policy. In the event of a failure or problem in the working path, the SR policy can switch to using the protecting path.

If path protection is required (or desired), the flow proceeds to block 504. At block 504, the SDN controller identifies the working and protecting path for each SR policy. For example, using the network illustrated in FIG. 4, the SDN controller 200 could include in the SR policy 450 both a working LSP reflecting one path from the node 420 to the node 428 and a protecting LSP reflecting another path from the node 420 to the node 428. The SDN controller 200 could do the same for the reverse SR policy 452.

At block 506, the SDN controller determines whether the Flex LSP requires congruent bi-directional paths. As discussed above in relation to block 308 in FIG. 3, in an embodiment, congruent bi-directional paths travel through the same nodes in each direction, while non-congruent bi-directional paths can travel through different nodes in the different directions. In an embodiment, the network administrator can configure the SDN controller to require congruent bi-directional paths.

If the SDN controller determines that congruent bi-directional paths are required, the flow proceeds to block 508. At block 508, the SDN controller ensures that the policies in each direction (e.g., the SR policies 450 and 452 illustrated in FIG. 4) use the same path. If path protection is required (as discussed above in relation to blocks 502 and 504), the SDN controller ensures that both the working and the protecting paths are congruent.

At block 510, the SDN controller determines whether the Flex LSP includes a bandwidth requirement. For example, a network administrator can configure the SDN controller to include a minimum bandwidth requirement for the paths within the SR policies. If the SDN controller determines that the Flex LSP includes a bandwidth requirement, the flow proceeds to block 512.

At block 512, the SDN controller ensures that the bi-directional SR policies (e.g., the SR policies 450 and 452 illustrated in FIG. 4) meet the bandwidth requirement. In an embodiment, the SDN controller reserves the required bandwidth for the SR policies. If path protection is required, the SDN controller ensures that both the working and the protecting paths meet the bandwidth requirement. Further, the SDN controller can take into account asymmetrical bandwidth requirements (e.g., a required minimum bandwidth in one direction, and a different required minimum bandwidth in the reverse direction).

Figure 6:
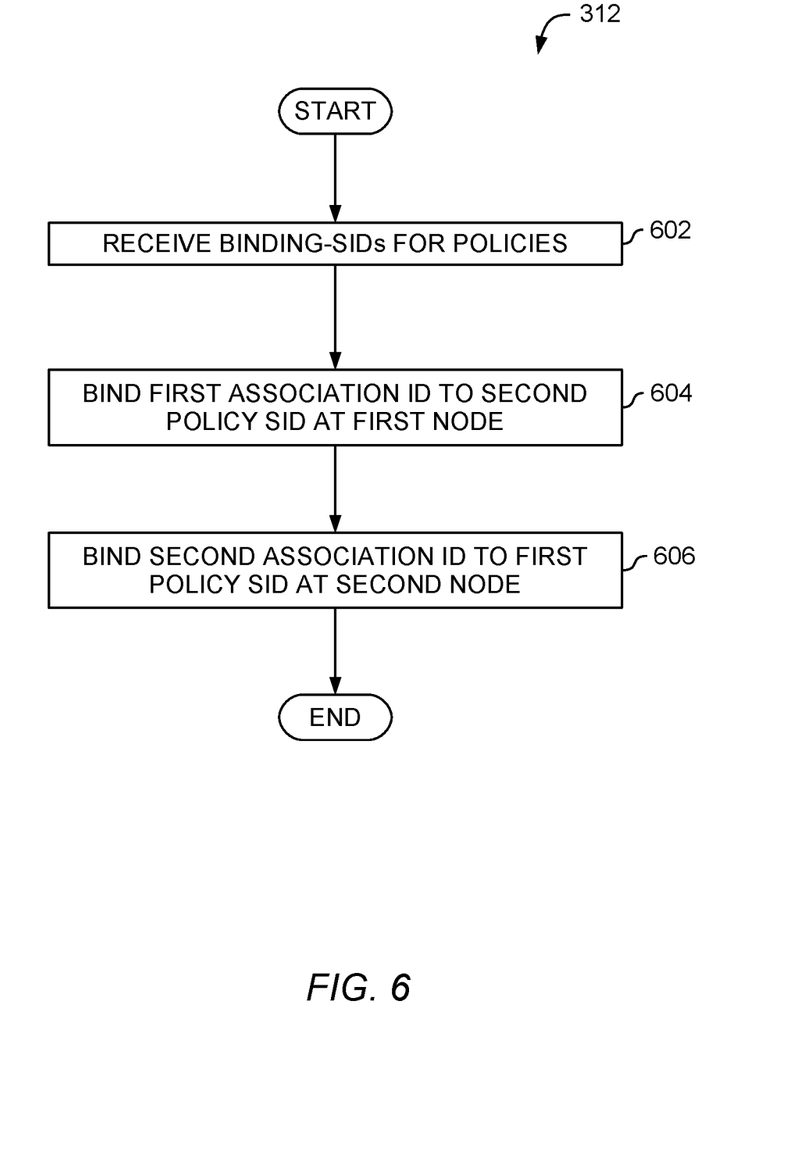
FIG. 6 is a flowchart illustrating binding SR policies to association labels, according to one embodiment described herein.

FIG. 6 is a flowchart illustrating binding SR policies to association labels, according to one embodiment described herein. In an embodiment, FIG. 6 corresponds to block 312 in FIG. 3. At block 602, an SDN controller (e.g., the SDN controller 200 illustrated in FIG. 4) receives the binding SIDs associated with the SR policies tied together to form the Flex LSP service (e.g., the binding SIDs associated with the SR policies 450 and 452 illustrated in FIG. 4).

At block 604, the SDN controller binds the first association label with the corresponding second SR policy SID at the first destination node. For example, at the node 428, the SDN controller binds the SID associated with the outing SR policy 452 to the association label associated with the incoming SR policy 450. At block 606, the SDN controller performs the mirror image operation, binding the second association label with the first policy SID at the second node. For example, at the node 420, the SDN controller binds the SID associated with the outgoing SR policy 450 to the association label associated with the incoming SR policy 452.

Figure 7:
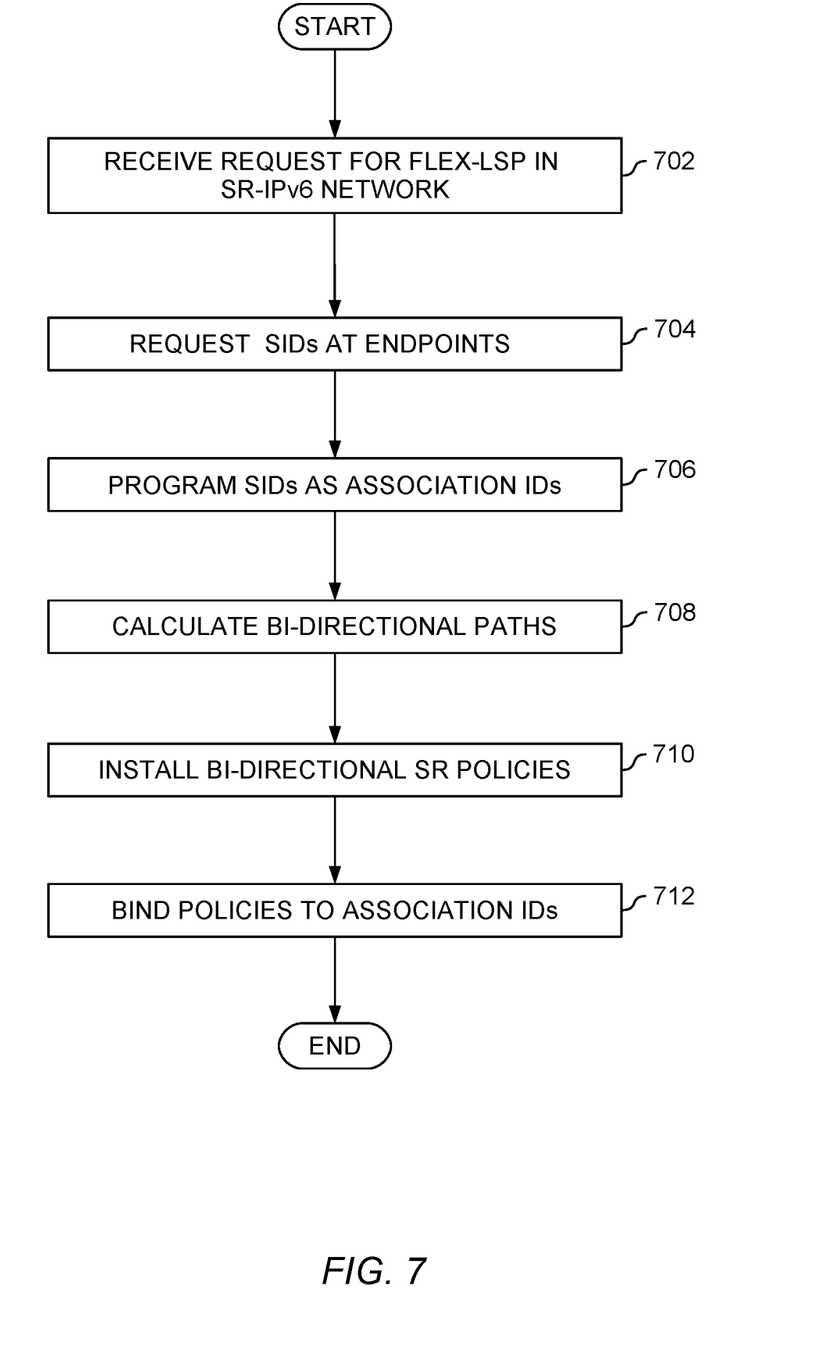
FIG. 7 is a flowchart illustrating implementing a Flex LSP service in an SR-IPv6 communication network, according to one embodiment described herein.

FIG. 7 is a flowchart illustrating implementing a Flex LSP service in an SR-IPv6 communication network, according to one embodiment described herein. In an embodiment, the flow of FIG. 7 is generally similar to FIG. 3, except an association ID (e.g., an SID) is used in place of an association label. At block 702, an SDN controller in an SR-IPv6 network receives a request to form a Flex LSP service. This is similar to block 302, discussed above, except that it is done in an SR-IPv6 network instead of an SR-MPLS network. The discussion will not otherwise be repeated here.

At block 704, the SDN controller requests SIDs from each of the endpoints. This is similar to block 304, above, except association SIDs (e.g., the SIDs END.ASSOCIATION1 and END.ASSOCIATION2) are used in place of association labels. Further, similar to block 304, above, in one embodiment the SDN controller can use a topological or service SID as the association SID and can use pseudocode to perform the association functionality in addition to regular processing.

At block 706, the SDN controller programs the SIDs received at block 704 as association SIDs at each endpoint node. This is similar to block 306, above, except association SIDs are used in place of association labels. The discussion will not otherwise be repeated here.

At block 708, the SDN controller calculates the bi-directional paths. This is similar to block 308, above, and will not be repeated here. At block 710, the SDN controller installs the bi-directional SR policies. This is similar to block 310, above, and will not be repeated here. At block 712, the SDN controller binds the policies to the association SIDs. This is similar to block 312, above, except association SIDs are used in place of association labels. The discussion will not otherwise be repeated here.

While techniques disclosed herein have been discussed in the context of SR-MPLS and SR-IPv6 networks, other suitable tunneling technologies can be used as well. For example, one or more of the techniques disclosed herein can be used with RSVP-TE, GPRS Tunneling Protocol (GTP), or other suitable tunneling technologies.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations or block diagrams of methods, apparatus (systems) and computer program products according to embodiments presented in this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the segment routing module 230) or related data available in the cloud. For example, the segment routing module 230 could execute on a computing system in the cloud and implement SR functionality in a communications network.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for implementing bi-directional paths in a segment routing communication network, the method comprising:

installing a first segment routing policy comprising a first path from a first node in the communication network to a second node in the communication network;

installing a second segment routing policy comprising a second path from the second node to the first node in the communication network;

binding, at the first node, a first identifier associated with the first segment routing policy to a second association identifier associated with the second segment routing policy; and binding, at the second node, a second identifier associated with the second segment routing policy to a first association identifier associated with the first segment routing policy.

2. The method of claim 1, further comprising:

requesting from the first node the second association identifier, and in response providing to the second node the second association identifier; and requesting from the second node the first association identifier, and in response providing to the first node the first association identifier.

3. The method of claim 1, further comprising:

transmitting a first packet from the first node to the second node using the first segment routing policy; and receiving the first packet at the second node, the first packet comprising routing information identifying the first association identifier.

4. The method of claim 3, further comprising transmitting a second packet from the second node to the first node using the second segment routing policy, wherein the second node selects the second segment routing policy based on the received first association identifier.

5. The method of claim 1, wherein the first identifier associated with the first segment routing policy is a binding segment identifier (SID).

6. The method of claim 5, wherein the second association identifier is an association label.

7. The method of claim 1, further comprising:

receiving at a software defined networking (SDN) controller a request for congruent bi-directional paths in the segment routing communication network; and determining that the first path and the second path are congruent.

8. The method of claim 1, further comprising:

receiving at an SDN controller a request for path protection relating to the bi-directional paths;

generating the first segment routing policy, the first segment routing policy comprising the first path from the first node to the second node and further comprising a third path from the first node to the second node; and generating the second segment routing policy, the second segment routing policy comprising the second path from the second node to the first node and further comprising a fourth path from the second node to the first node.

9. The method of claim 1, further comprising:

receiving at an SDN controller a request for bi-directional paths in a segment routing network, the request comprising a bandwidth requirement; and determining, using the SDN controller, that the first segment routing policy and the second segment routing policy meet the bandwidth requirement.

10. The method of claim 1, further comprising:

receiving at an SDN controller a request for bi-directional paths in a segment routing network, wherein the SDN controller installs the first and second segment routing policies, wherein the SDN controller binds the first identifier associated with the first segment routing policy to the second association identifier associated with the second segment routing policy, and wherein the SDN controller binds the second identifier associated with the second segment routing policy to the first association identifier associated with the first segment routing policy.

11. A computer program product for implementing bi-directional paths in a segment routing communication network, the computer program product comprising:

a non-transitory computer-readable storage medium having computer-readable program code embodied therewith, the computer-readable program code executable by one or more computer processors to perform an operation, the operation comprising:

installing a first segment routing policy comprising a first path from a first node in the communication network to a second node in the communication network;

installing a second segment routing policy comprising a second path from the second node to the first node in the communication network;

binding, at the first node, a first identifier associated with the first segment routing policy to a second association identifier associated with the second segment routing policy; and binding, at the second node, a second identifier associated with the second segment routing policy to a first association identifier associated with the first segment routing policy.

12. The computer program product of claim 11, the operation further comprising:

requesting from the first node the second association identifier, and in response providing to the second node the second association identifier; and requesting from the second node the first association identifier, and in response providing to the first node the first association identifier.

13. The computer program product of claim 11, wherein the first identifier associated with the first segment routing policy is a binding SID and wherein the second association identifier is an association label.

14. The computer program product of claim 11, the operation further comprising:

receiving at an SDN controller a request for bi-directional paths in a segment routing network, wherein the SDN controller installs the first and second segment routing policies, wherein the SDN controller binds the first identifier associated with the first segment routing policy to the second association identifier associated with the second segment routing policy, and wherein the SDN controller binds the second identifier associated with the second segment routing policy to the first association identifier associated with the first segment routing policy.

15. A system, comprising:

a processor; and a memory storing a program, which, when executed on the processor, performs an operation, the operation comprising:

installing a first segment routing policy comprising a first path from a first node in a communication network to a second node in the communication network;

installing a second segment routing policy comprising a second path from the second node to the first node in the communication network;

binding, at the first node, a first identifier associated with the first segment routing policy to a second association identifier associated with the second segment routing policy; and binding, at the second node, a second identifier associated with the second segment routing policy to a first association identifier associated with the first segment routing policy.

16. The system of claim 15, the operation further comprising:

requesting from the first node the second association identifier, and in response providing to the second node the second association identifier; and requesting from the second node the first association identifier, and in response providing to the first node the first association identifier.

17. The system of claim 15, the operation further comprising:

transmitting a first packet from the first node to the second node using the first segment routing policy;

receiving the first packet at the second node, the first packet comprising routing information identifying the first association identifier; and transmitting a second packet from the second node to the first node using the second segment routing policy, wherein the second node selects the second segment routing policy based on the received first association identifier.

18. The system of claim 15, wherein the first identifier associated with the first segment routing policy is a binding SID and wherein the second association identifier is an association label.

19. The system of claim 15, the operation further comprising:

receiving at an SDN controller a request for congruent bi-directional paths in the segment routing communication network; and determining that the first path and the second path are congruent.

20. The system of claim 15, the operation further comprising:

receiving at an SDN controller a request for path protection relating to bi-directional paths;

generating the first segment routing policy, the first segment routing policy comprising the first path from the first node to the second node and further comprising a third path from the first node to the second node; and generating the second segment routing policy, the second segment routing policy comprising the second path from the second node to the first node and further comprising a fourth path from the second node to the first node.

* * * * *